(12) United States Patent
Nagashima et al.

(10) Patent No.: US 8,011,790 B2
(45) Date of Patent: Sep. 6, 2011

(54) IMAGE DISPLAY APPARATUS HAVING CASINGS FOLDABLE RELATIVE TO EACH OTHER

(75) Inventors: Kenji Nagashima, Daito (JP); Atsuhiko Chikaoka, Daito (JP); Seiji Takemoto, Daito (JP); Hiroki Matsubara, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 392 days.

(21) Appl. No.: 12/267,351

(22) Filed: Nov. 7, 2008

(65) Prior Publication Data

US 2009/0122271 A1     May 14, 2009

(30) Foreign Application Priority Data

Nov. 14, 2007   (JP) ................... 2007-295735

(51) Int. Cl.
  *G03B 21/22* (2006.01)
(52) U.S. Cl. .............. 353/71; 353/74; 353/119
(58) Field of Classification Search ............ 353/79, 353/99, 119, 50, 66, 67, 71, 74–78, 82
  See application file for complete search history.

(56) References Cited

U.S. PATENT DOCUMENTS

| 5,343,262 | A * | 8/1994 | Park .................... 353/119 |
| 5,349,400 | A | 9/1994 | Kaplan et al. |
| 6,334,687 | B1 | 1/2002 | Chino et al. |
| 2002/0163482 | A1 * | 11/2002 | Sullivan ............. 345/6 |
| 2003/0095239 | A1 | 5/2003 | Hirao et al. |
| 2005/0140941 | A1 * | 6/2005 | Maddock .............. 353/119 |
| 2006/0290896 | A1 | 12/2006 | Nishida |
| 2007/0171375 | A1 | 7/2007 | Mizuuchi et al. |
| 2009/0079945 | A1 * | 3/2009 | Klosowiak et al. ....... 353/69 |

FOREIGN PATENT DOCUMENTS

| JP | 57-30826 | 2/1982 |
| JP | 5-207405 | 8/1993 |
| JP | 7-49533 | 2/1995 |
| JP | 7-114103 | 5/1995 |
| JP | 8-5980 | 1/1996 |
| JP | 8-194202 | 7/1996 |
| JP | 10-206969 | 8/1998 |
| JP | 2007-4031 | 1/2007 |
| WO | 03/019287 A1 | 3/2003 |

OTHER PUBLICATIONS

European Search Report for European Application No. 08019639.7-2209, mailed on Mar. 31, 2009 (5 pages).
Patent Abstracts of Japan for Japanese Publication No. 57030826, Publication date Feb. 19, 1982 (1 page).

(Continued)

*Primary Examiner* — Thanh X Luu
(74) *Attorney, Agent, or Firm* — Osha • Liang LLP

(57) ABSTRACT

An image display apparatus is provided that allows a user to check image content even in a place where there is no projection screen. A projector that is one mode of the image display apparatus includes a casing, a projection aperture provided in the casing, and an internal projection mirror and a built-in screen that are provided in a casing. When the projector is being folded, laser light emitted from the projection aperture is reflected by the internal projection mirror. The reflected light is projected onto the built-in screen, whereby an image is displayed.

6 Claims, 17 Drawing Sheets

OTHER PUBLICATIONS

Patent Abstracts of Japan for Japanese Publication No. 10206969, Publication date Aug. 7, 1998 (1 page).
European Search Report for European Application No. 08019639.7-2209, mailed on Jun. 25, 2009 (8 pages).
Patent Abstracts of Japan for Japanese Publication No. 07114103, Publication date May 2, 1995 (1 page).
Patent Abstracts of Japan for Japanese Publication No. 08-194202, Publication date Jul. 30, 1996 (1 page).
Patent Abstracts of Japan for Japanese Publication No. 08-005980, Publication date Jan. 12, 1996 (1 page).
Patent Abstracts of Japan for Japanese Publication No. 07-049533, Publication date Feb. 21, 1995 (1 page).
Patent Abstracts of Japan for Japanese Publication No. 05-207405, Publication date Aug. 13, 1993 (1 page).
Patent Abstracts of Japan for Japanese Publication No. 2007-004031, Publication date Jan. 11, 2007 (1 page).

* cited by examiner

IMAGE DISPLAY APPARATUS HAVING CASINGS FOLDABLE RELATIVE TO EACH OTHER

BACKGROUND OF THE INVENTION

1. Field of the Invention

The present invention relates to an image display apparatus, and more particularly, to an image display apparatus that can display an image without performing external projection.

2. Description of the Background Art

For a projector that is one of image display apparatuses, there is a type of projector that displays an image on a screen provided external to the projector and on a monitor provided in a projector main body.

For example, Japanese Patent Laying-Open No. 2007-004031 discloses a compact projector apparatus having both a small-screen projection function and a large-screen projection function.

Japanese Patent Laying-Open No. 05-207405 discloses a video projector that can project an image onto a monitor screen provided in a case.

Japanese Patent Laying-Open No. 07-049533 discloses a projector apparatus that can be used as a screen-incorporated type apparatus that can display an excellent image regardless of day or night and as an external screen projection type apparatus.

Japanese Patent Laying-Open No. 08-005980 discloses a liquid crystal projector that can implement both a transmission type and a projection type.

Japanese Patent Laying-Open No. 08-194202 discloses a projector apparatus with which a user can enjoy projection onto a small monitor screen and a large screen.

However, provision of a monitor screen may complicate the configuration of an image display apparatus. In addition, in the case of a projector using a laser as a light source, laser light may accidentally enter the eyes of a user during an operation.

SUMMARY OF THE INVENTION

The present invention has been made to solve problems such as those described above, and therefore, an object of the present invention is to provide an image display apparatus that allows a user to check image content even in a place where there is no projection screen, without complicating the configuration of the apparatus.

Another object is to provide an image display apparatus that can prevent laser light exposure.

In summary, an image display apparatus according to one aspect of the present invention includes a first casing, a second casing, and a third casing. The first casing and the second casing are configured to be foldable relative to each other. The second casing and the third casing are configured to be foldable relative to each other. The image display apparatus includes a light source that emits laser light; a projecting unit disposed in the first casing and configured to project laser light outside the image display apparatus; a screen disposed in the third casing and receiving an image to be projected; and a reflecting unit disposed in the third casing and configured to reflect the laser light from the light source toward the screen.

Preferably, a surface to which the reflecting unit is attached faces the screen.

Preferably, when the first casing and the third casing are folded, an optical axis of the projecting unit reaches a surface of the reflecting unit.

Preferably, the image display apparatus further includes: a detecting unit configured to detect movement of the first casing; and a control unit configured to control light emission by the light source, in response to the movement detection.

Preferably, the control unit is configured to suppress an output from the light source to a preset output or less.

Preferably, the control unit is configured to stop an operation of the light source.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 9 is a timing chart showing a change in the amount of light after power to projector 100 is turned on.

DESCRIPTION OF THE PREFERRED EMBODIMENTS

Figure 1:
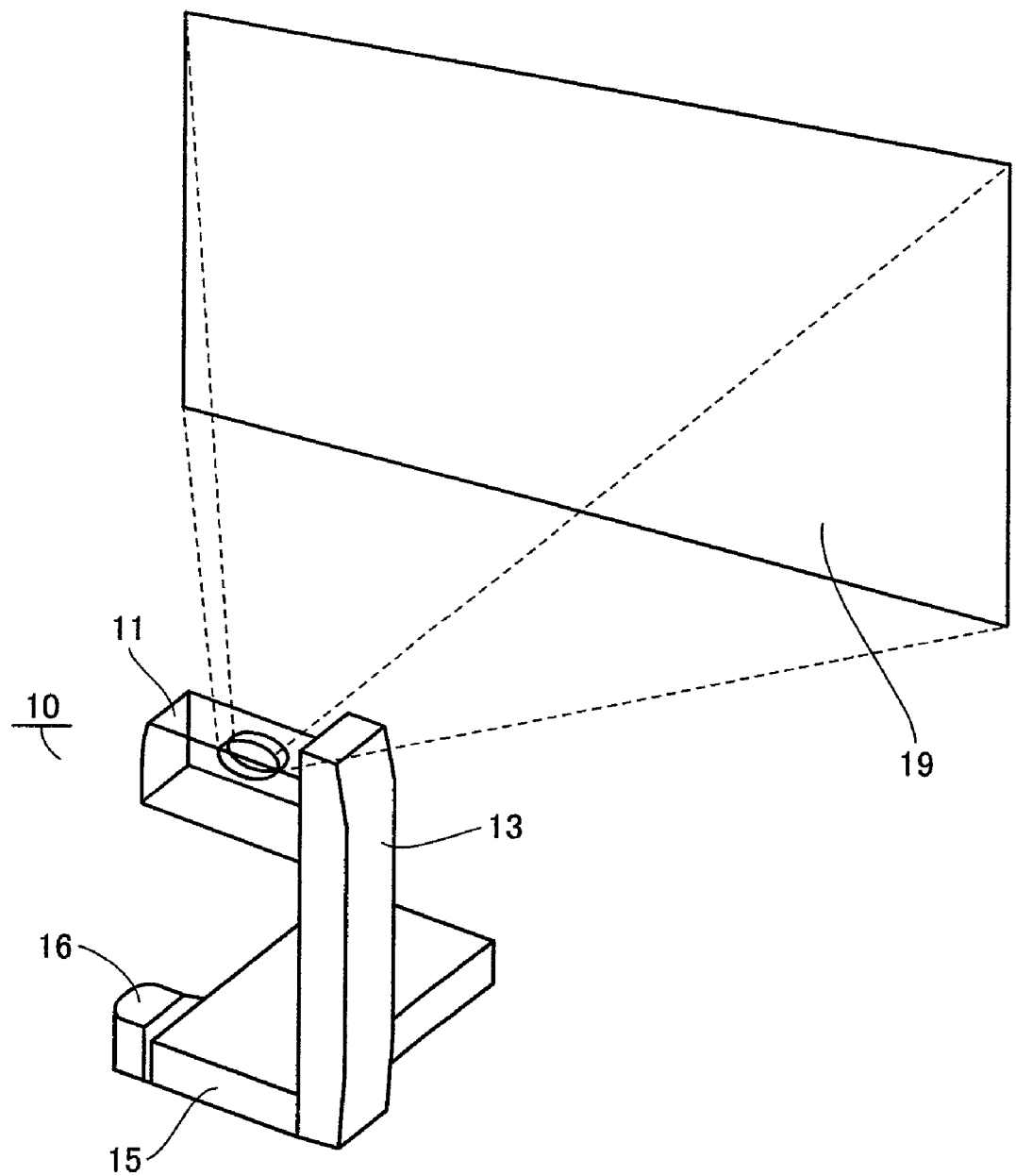
FIG. 1 is a diagram schematically showing a configuration of a projector 10.

With reference to the drawings, embodiments of the present invention will be described below. In the following description, the same elements are denoted by the same reference numerals. The names and functions of such elements are also the same. Thus, detailed description thereof is not repeated.

First Embodiment

[External Appearance]

With reference to FIG. 1, a projector 10 according to a first embodiment of the present invention will be described. FIG. 1 is a diagram schematically showing a configuration of projector 10. Projector 10 includes a casing 11, a casing 13, a casing 15, and a casing 16. The casings are configured, as will be described later, such that the positions thereof can be changed by each rotating shaft. Casing 11 includes a projection aperture 17. Laser lights emitted from projection aperture 17 project an image onto a screen 19.

[Use Mode]

Figure 2A:
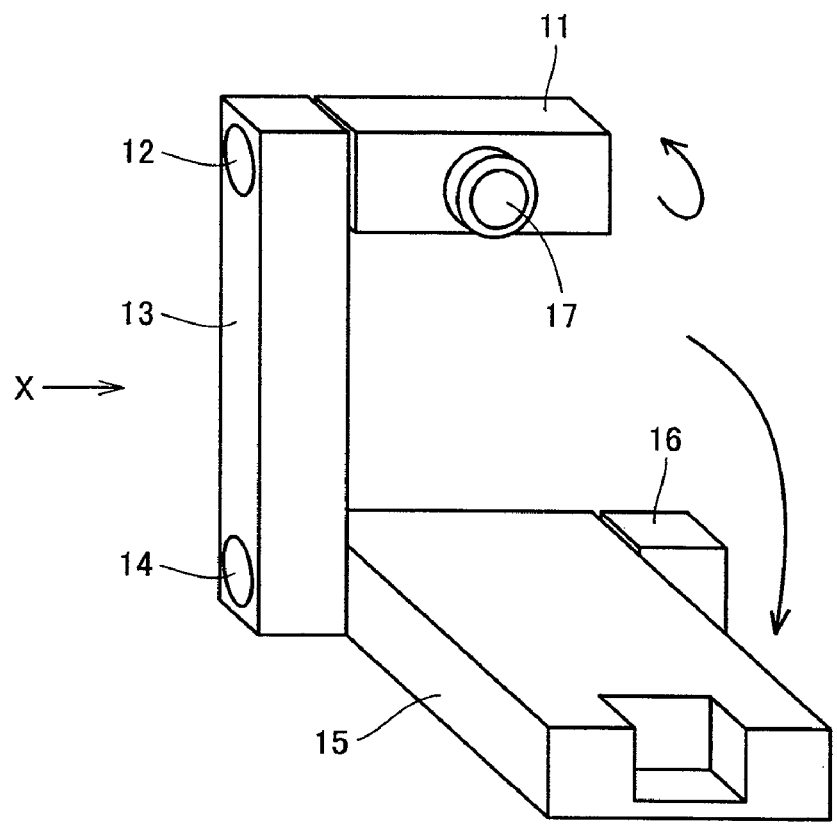
FIGS. 2A and 2B are diagrams showing a mode in which projector 10 is used for the case of projection onto a screen.
Figure 2B:
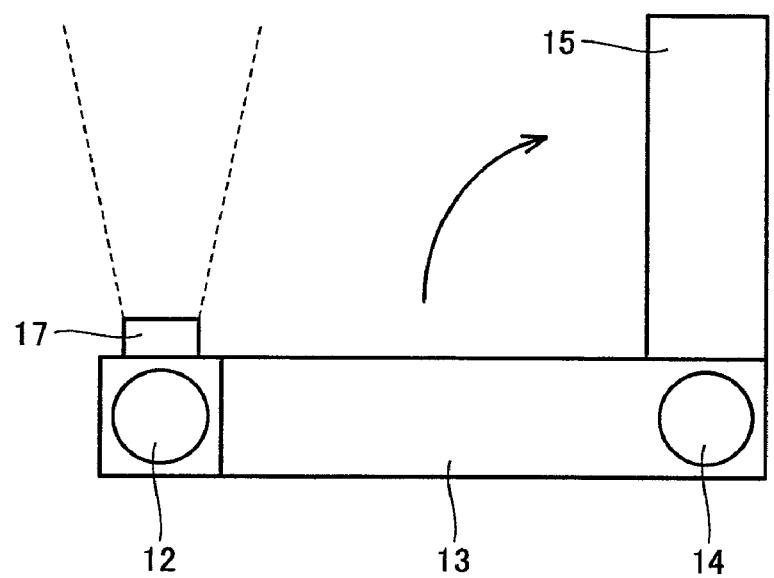

With reference to FIGS. 2A, 2B, 3A, and 3B, a use mode of projector 10 according to the embodiment of the present invention will be described. FIGS. 2A and 2B are diagrams showing a mode in which projector 10 is used for the case of projection onto a screen. With reference to FIG. 2A, casings 11 and 13 are coupled together by a rotating shaft 12. Casing 11 is rotatably configured so that the orientation of projection aperture 17 can be changed by rotating shaft 12.

Casings 13, 15, and 16 are coupled together by a rotating shaft 14. More specifically, casing 15 is configured so as to be foldable relative to the center of rotation of rotating shaft 14.

FIG. 2B is a diagram showing projector 10 shown in FIG. 2A from an X direction. Lights emitted from projection aperture 17 are emitted outside projector 10. Therefore, when projector 10 is being assembled, an image can be shown on screen 19, for example, as shown in FIG. 1.

Figure 3A:
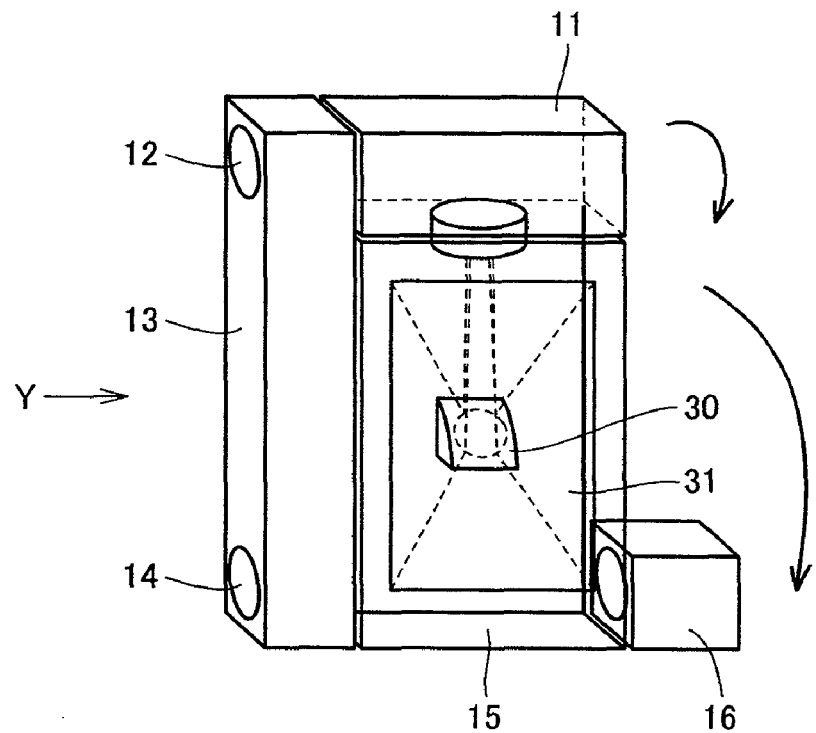
FIGS. 3A and 3B are diagrams showing a state in which projector 10 is folded.
Figure 3B:
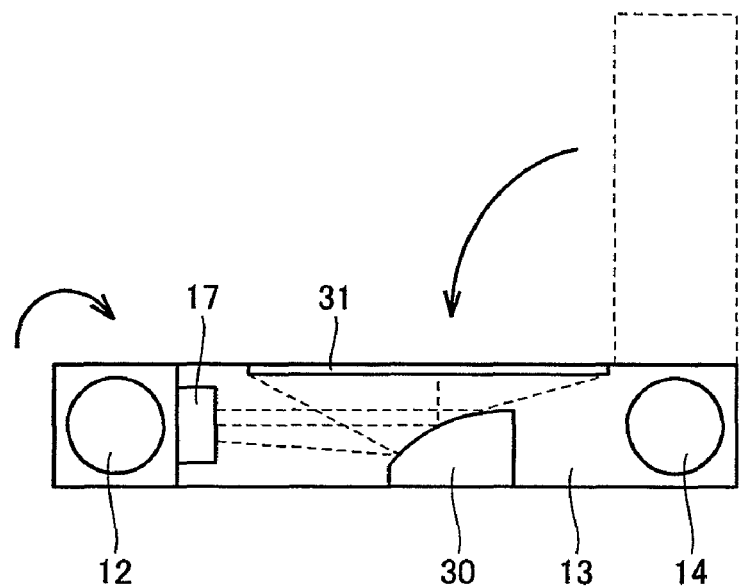

FIGS. 3A and 3B are diagrams showing a state in which projector 10 is folded. With reference to FIG. 3A, projector 10 includes, inside casing 15, an internal projection mirror 30 and a built-in screen 31, in addition to the configuration shown in FIG. 1. Built-in screen 31 is configured, for example, as a translucent resin plate.

Internal projection mirror 30 is configured such that when casings 11 and 15 are folded, light emitted from projection aperture 17 is reflected toward built-in screen 31. A surface of internal projection mirror 30 may be a plane mirror or internal projection mirror 30 may be formed such that the surface thereof has a convex shape according to the size of built-in screen 31. In this case, in one aspect, the surface of internal projection mirror 30 can be specified according to the distance between internal projection mirror 30 and built-in screen 31.

FIG. 3B is a diagram showing projector 10 shown in FIG. 3A from a Y direction. The light emitted from projection aperture 17 is reflected by internal projection mirror 30. The reflected light reaches built-in screen 31, forming an image. As a result, a user of projector 10 can visually recognize the image shown on built-in screen 31.

[Hardware Configuration]

Figure 4:
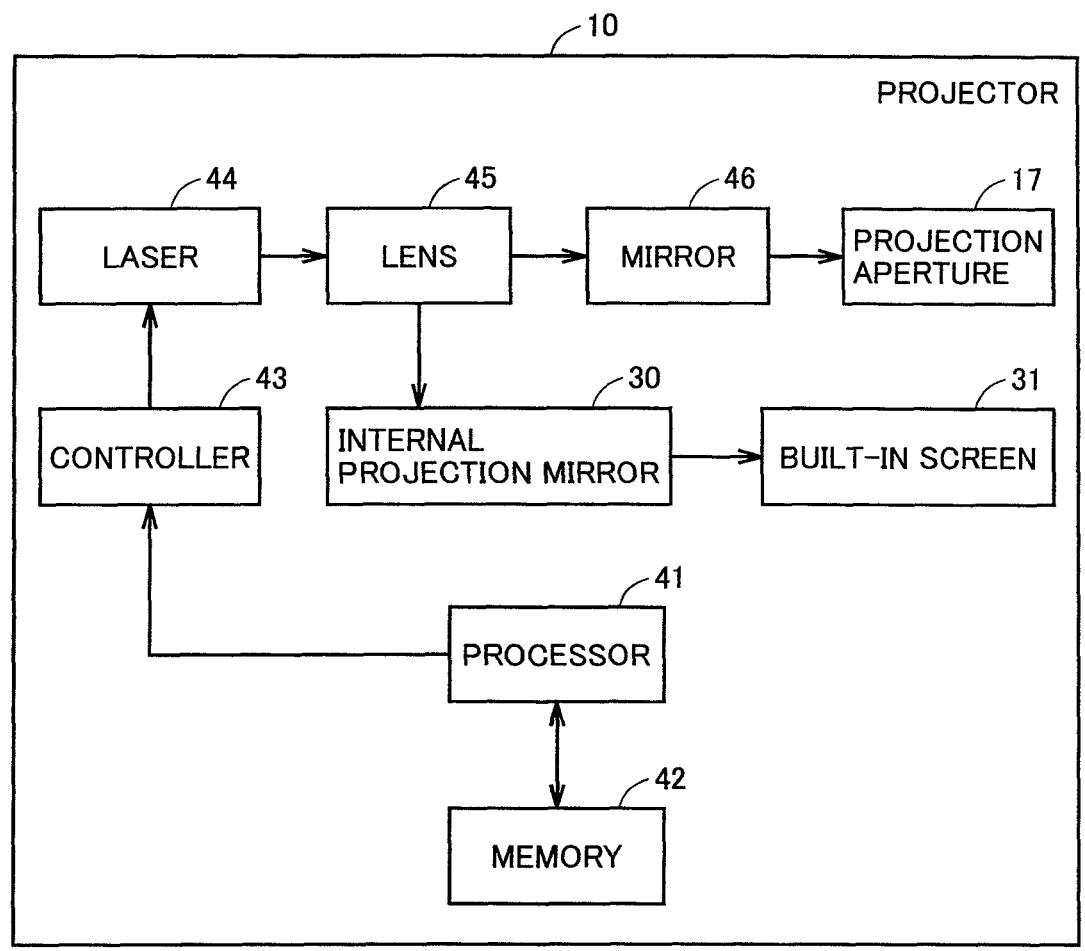
FIG. 4 is a block diagram showing a configuration of an optical system of projector 10.

With reference to FIG. 4, a hardware configuration of projector 10 according to the embodiment of the present invention will be described. FIG. 4 is a block diagram showing a configuration of an optical system of projector 10. Projector 10 includes a processor 41, a memory 42, a controller 43, a laser 44, a lens 45, and a mirror 46, in addition to the configuration shown in FIGS. 1 to 3.

Processor 41 controls the operation of projector 10 based on an instruction provided to projector 10. Memory 42 stores data generated by processor 41 or data provided to projector 10 from an external source. Memory 42 may be either a non-volatile memory or volatile memory. In another aspect, memory 42 can also be configured as an information recording medium that is removable from projector 10.

Controller 43 controls laser 44 based on a signal sent from processor 41. Controller 43 provides a control signal according to the signal from processor 41 to laser 44. Laser 44 outputs RGB laser light according to the control signal. The light outputted from laser 44 enters lens 45.

When projector 10 is open, i.e., when projector 10 is in a state of projecting an image onto a screen, the light coming out of lens 45 is emitted toward mirror 46. Mirror 46 reflects the light and provides the reflected light to projection aperture 17. The projection aperture 17 projects the light toward, for example, external screen 19.

On the other hand, when projector 10 is folded, i.e., when projector 10 is in a state of projecting an image onto built-in screen 31, as shown in FIG. 3, the light transmitted through lens 45 is reflected by internal projection mirror 30. The reflected light reaches built-in screen 31, forming an image on a surface of built-in screen 31.

In the above-described manner, projector 10 according to the first embodiment of the present invention can show video on an interior of projector 10, i.e., built-in screen 31, when being folded. Thus, even in a place where there is no screen, an image to be projected can be easily checked.

Second Embodiment

Next, a second embodiment of the present invention will be described. An image display apparatus according to the present embodiment is different from the image display apparatus according to the foregoing embodiment in that the apparatus has a function of suppressing outputs of laser light when detecting an operation by a user.

[Use Mode]

Figure 5:
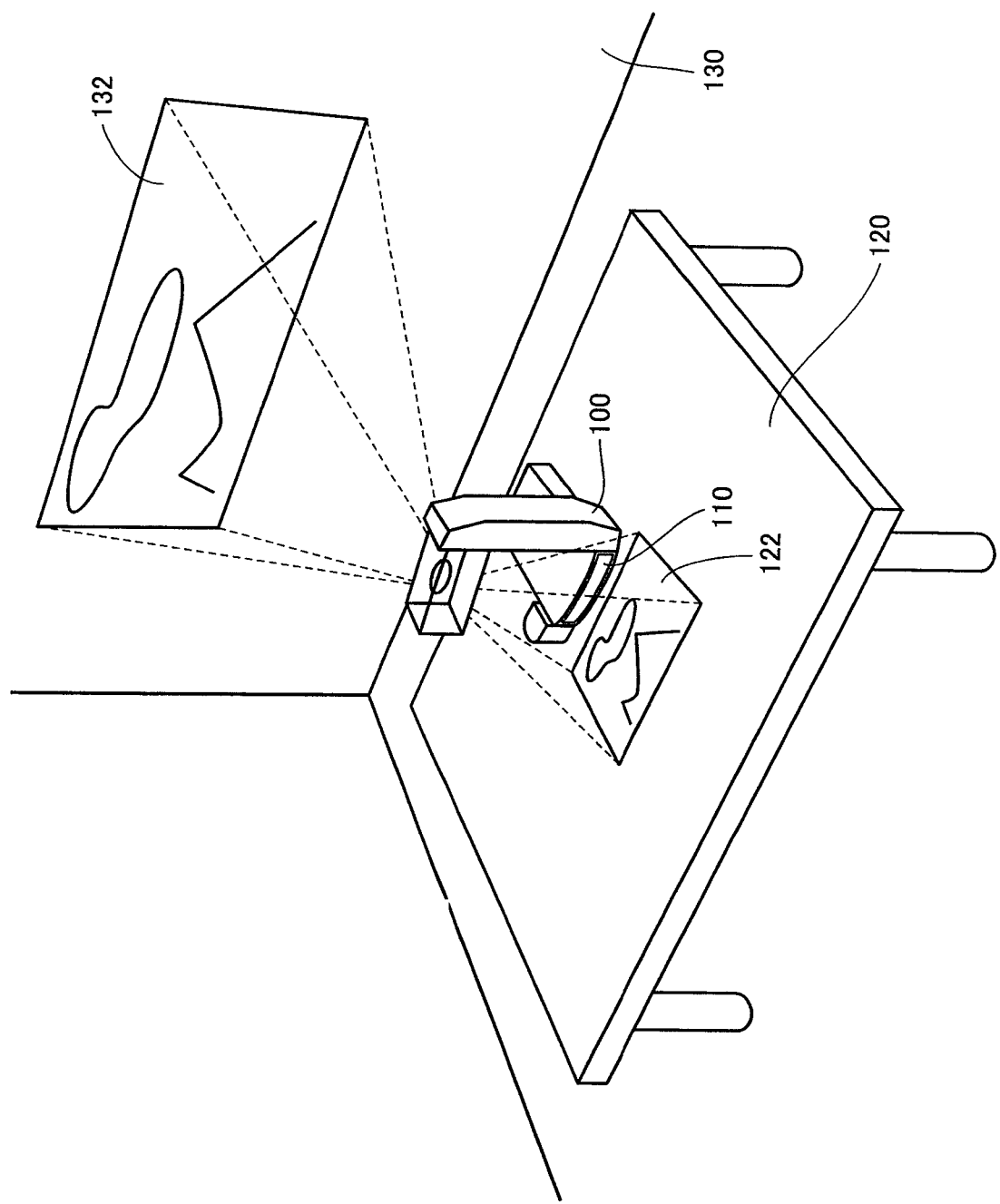
FIG. 5 is a diagram showing a state in which a projector 100 is set up.

With reference to FIG. 5, a use mode of an image display apparatus according to a second embodiment of the present invention will be described. FIG. 5 is a diagram showing a state in which a projector 100 which is one mode of an image display apparatus is set up. Projector 100 is of a portable size, for example, but may be a stationary projector.

Projector 100 is disposed on a table 120. Projector 100 projects an image 132 for presentation onto a wall 130 serving as a screen. Also, projector 100 projects an image 122 onto a top surface of table 120 so that a user of projector 100 can see image 122. The size of image 122 is normally smaller than that of image 132. In one aspect, projector 100 includes a CCD (Charge Coupled Device) sensor 110. Note that CCD sensor 110 is not an essential configuration in projector 100 according to the present embodiment.

[Functional Configuration]

Figure 6:
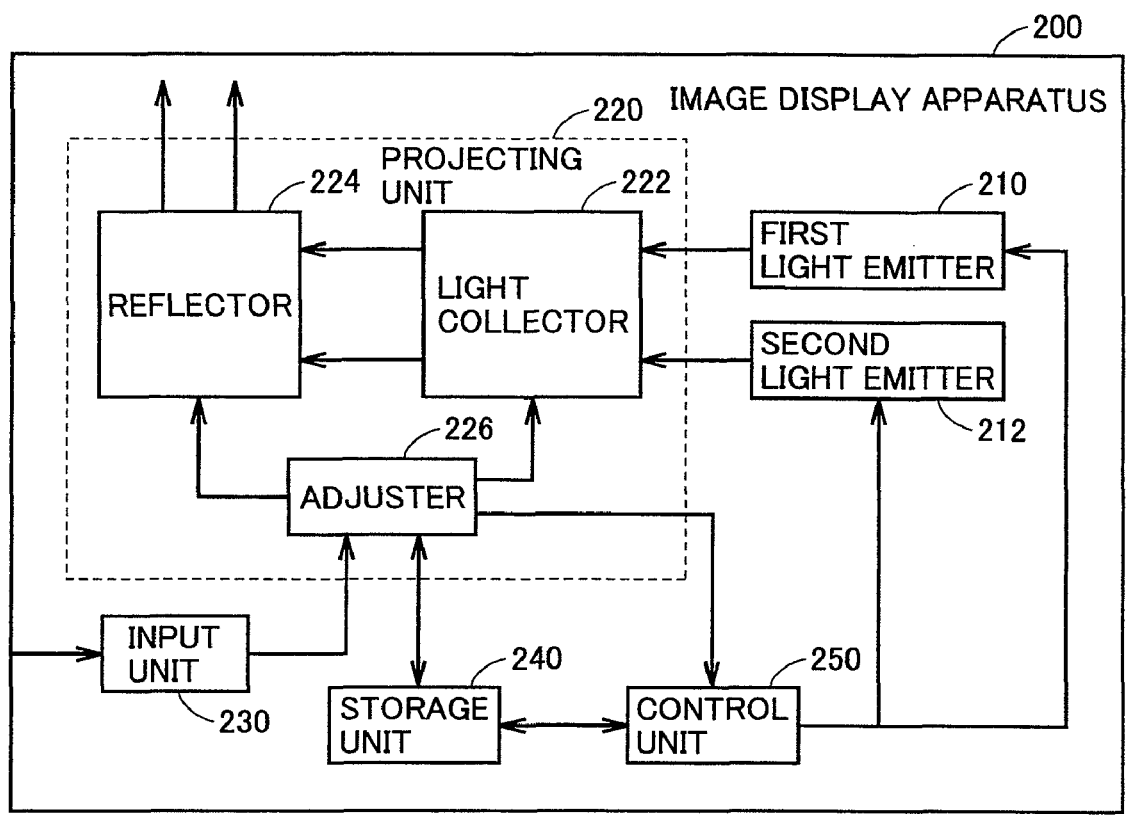
FIG. 6 is a block diagram showing configurations of functions of an image display apparatus 200 according to the present invention.

With reference to FIG. 6, a configuration of an image display apparatus 200 according to the present invention will be described. FIG. 6 is a block diagram showing a configuration of functions of image display apparatus 200. Image display apparatus 200 includes a first light emitter 210, a second light emitter 212, a projecting unit 220, an input unit 230, a storage unit 240, and a control unit 250. Projecting unit 220 includes a light collector 222, a reflector 224, and an adjuster 226.

First light emitter 210 is configured to emit a first laser light having a certain wavelength. Second light emitter 212 is configured to emit a second laser light having a wavelength different from the certain wavelength. The laser light emitted from first light emitter 210 and second light emitter 212 enters light collector 222. Light collector 222 causes the laser light to exit to reflector 224 in a certain direction.

Reflector 224 is configured to reflect the first laser light and the second laser light. More specifically, reflector 224 reflects the first laser light and the second laser light toward an exit aperture (not shown) of image display apparatus 200. In one aspect, reflector 224 includes a galvanometer mirror. Preferably, the galvanometer mirror can adjust two axes.

Input unit 230 is configured to accept an input of an operation performed on image display apparatus 200. When input unit 230 accepts an input of an operation, input unit 230 sends out a signal according to the input to adjuster 226. In one aspect, input unit 230 is implemented as buttons, a touch panel, or other switches.

Adjuster 226 is configured to adjust the projection direction of light reflected by reflector 224 or the size or shape of a projection surface, based on the input sent from input unit 230. Note that all of the above-described items (projection direction, size, and shape) are not always included as adjustment targets, and any of the items may selectively serve as an adjustment target. In one aspect, adjuster 226 functions as an actuator configured to drive reflector 224. In one aspect, adjuster 226 includes a lens, a beam splitter that splits a first laser light and a second laser light transmitted through the lens, a hologram element disposed to receive laser light split by the beam splitter, and a detector configured to detect light transmitted by the hologram element. At this time, control unit 250 suppresses the amount of light emission of laser light outputted from first light emitter 210 and second light emitter 212, based on the drive of reflector 224.

In another aspect, adjuster 226 is configured to make an optical path of a first laser light substantially parallel to an optical path of a second laser light. Control unit 250 suppresses the output levels of the first laser light and the second laser light based on the drive of adjuster 226 such as that described above.

Storage unit 240 stores parameters (e.g., data for specifying the angle of reflector 224) that are used when adjuster 226 drives. In one aspect, storage unit 240 is configured as a non-volatile memory.

Control unit 250 is configured to control the amounts of light emission from first light emitter 210 and second light emitter 212, based on an operation for adjusting the projection direction of the light. Control unit 250 is implemented as a processor or other arithmetic and control unit.

In one aspect, control unit 250 suppresses the amounts of light emission emitted from first light emitter 210 and second light emitter 212 to a predetermined amount of light emission or less.

In one aspect, when control unit 250 detects an operation for adjusting the projection direction of the light, control unit 250 suppresses the amounts of light emission from first light emitter 210 and second light emitter 212 for a predetermined period of time.

Preferably, when control unit 250 detects completion of an operation for adjusting the projection direction of lights, control unit 250 controls first light emitter 210 and second light emitter 212 such that the amounts of light emission from first light emitter 210 and second light emitter 212 become those obtained before performing the adjustment operation.

[Hardware Configuration]

Figure 7:
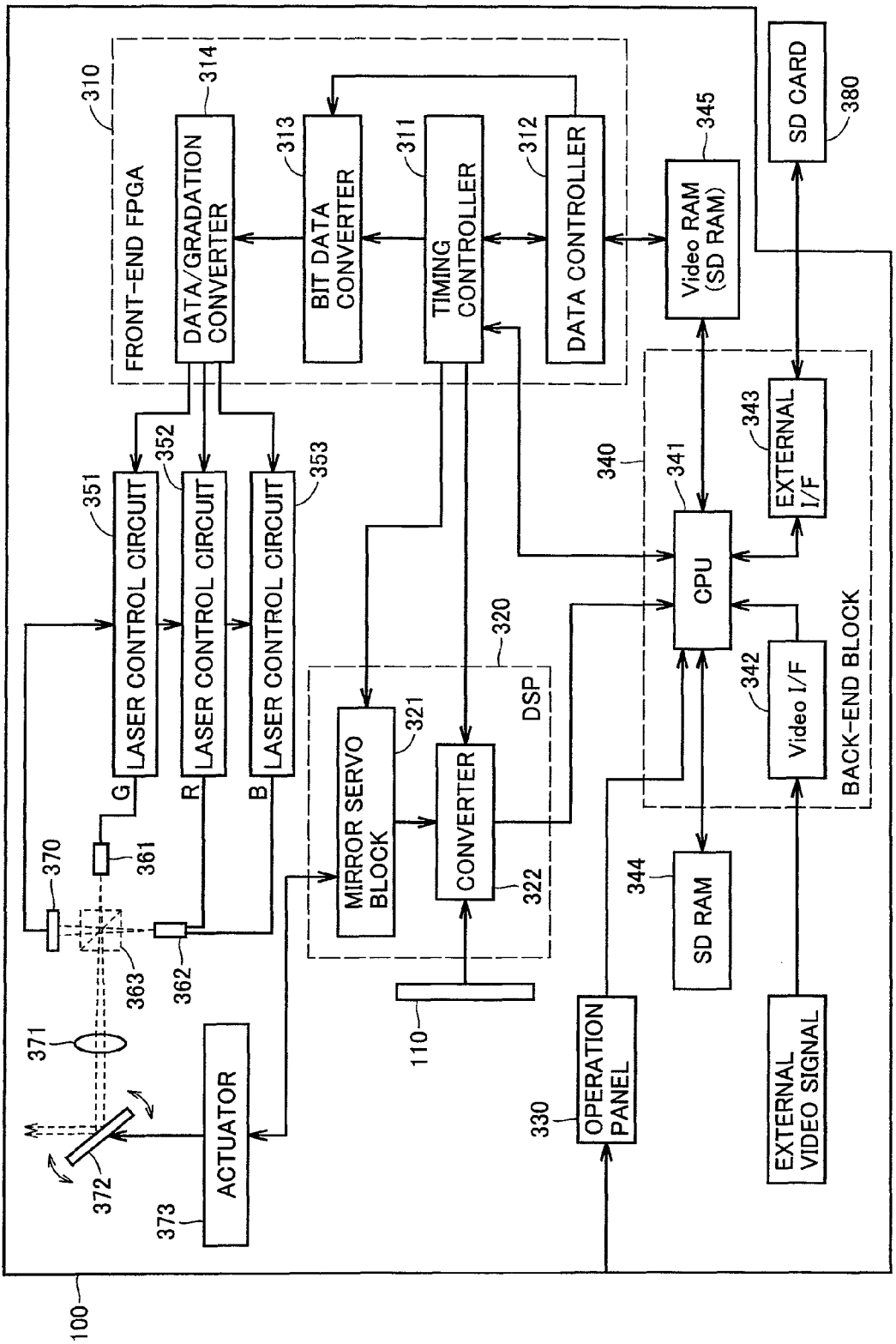
FIG. 7 is a block diagram showing a hardware configuration of projector 100.

Next, with reference to FIG. 7, a specific configuration of projector 100 which is an example of image display apparatus 200 will be described. FIG. 7 is a block diagram showing a hardware configuration of projector 100.

Projector 100 includes a front-end FPGA (Field Programmable Gate Array) 310, a digital signal processor 320, an operation panel 330, a back-end block 340, an SDRAM (Synchronous Dynamic Random Access Memory) 344, a video RAM 345, laser control circuits 351, 352, and 353, a green LD (Laser Diode) 361, a red/blue LD 362, a polarization beam splitter 363, a detector 370, a galvanometer mirror 372, and an actuator 373.

Front-end FPGA 310 includes a data/gradation converter 314, a timing controller 311, a data controller 312, and a bit data converter 313. Digital signal processor 320 includes a mirror servo block 321 and a converter 322. Although red/blue LD 362 is such that a red LD and a blue LD are integrally formed, red/blue LD 362 may be separately formed.

Operation panel 330 is provided on a front surface or side surface of a casing of projector 100. Operation panel 330 includes, for example, a display apparatus (not shown) that displays operation content; and switches (e.g., plus/minus buttons) that accept an operation input performed on projector 100. When operation panel 330 accepts an operation, operation panel 330 sends out a signal according to the operation to a CPU 341 of back-end block 340.

An image signal provided from an external source of projector 100 is inputted to a video interface 342. In one aspect, projector 100 includes an external interface 343. External interface 343 accepts, for example, placement of an SD card 380. External interface 343 reads data from SD card 380 and the data is stored in SDRAM 344 or video RAM 345.

CPU 341 controls projection of video obtained based on a signal inputted to projector 100 through video interface 342 or external interface 343, based on an operation input provided to operation panel 330. More specifically, by CPU 341 performing mutual communication with timing controller 311 of front-end FPGA 310, CPU 341 controls display of video obtained based on image data that is temporarily stored in video RAM 345.

In front-end FPGA 310, timing controller 311 reads data stored in video RAM 345 through data controller 312 based on an instruction sent from CPU 341. Data controller 312 sends out the read data to bit data converter 313. Bit data converter 313 sends out the data to data/gradation converter 314 based on an instruction from timing controller 311. Bit data converter 313 converts image data provided from an external source, into a format that conforms to a format for projection by the laser light emission.

Data/gradation converter 314 converts the data outputted from bit data converter 313, into color gradation for displaying the data as three colors of G, R, and B and sends out the converted data to laser control circuits 351, 352, and 353.

On the other hand, timing controller 311 controls drive of two-axis galvanometer mirror 372 with digital signal processor 320. More specifically, timing controller 311 sends out an instruction to mirror servo block 321 to drive actuator 373. In response to the instruction, actuator 373 changes the position and the tilt of two-axis galvanometer mirror 372.

Converter 322 A/D (Analog to Digital) converts a signal sent from CCD sensor 110, based on a signal sent from timing controller 311 and sends out digital data obtained after the conversion to CPU 341. For example, when CCD sensor 110 shoots a subject present within a shootable range thereof, an image signal of the subject is sent to CPU 341. When a setting for displaying an image shot by CCD sensor 110 is valid, CPU 341 sends an instruction to timing controller 311 to display an image based on data corresponding to the image signal.

Also, converter 322 transmits a signal sent from mirror servo block 321, to CPU 341. For example, converter 322 generates a signal including an instruction provided to actuator 373 and a state of actuator 373 and sends out the signal to CPU 341.

Laser control circuit 351 controls drive of green LD 361 based on a signal sent from data/gradation converter 314. Similarly, laser control circuits 352 and 353 respectively control the red LD and the blue LD according to an instruction sent from data/gradation converter 314. Green LD 361 and red/blue LD 362 emit laser lights according to their respective controls.

Polarization beam splitter 363 is disposed on an optical path of a laser light emitted from green LD 361. Polarization beam splitter 363 transmits green LD 361. Also, polarization beam splitter 363 partially transmits and partially reflects red/blue LD 362. Detector 370 is disposed on an optical path of the laser light emitted from red/blue LD 362. The laser light transmitted through polarization beam splitter 363 is collected in a certain area through a lens 371 and reflected by two-axis galvanometer mirror 372. The reflected light is projected outside projector 100. At this time, two-axis galvanometer mirror 372 changes the tilt thereof by drive of actuator 373.

[Control Structure]

Figure 8:
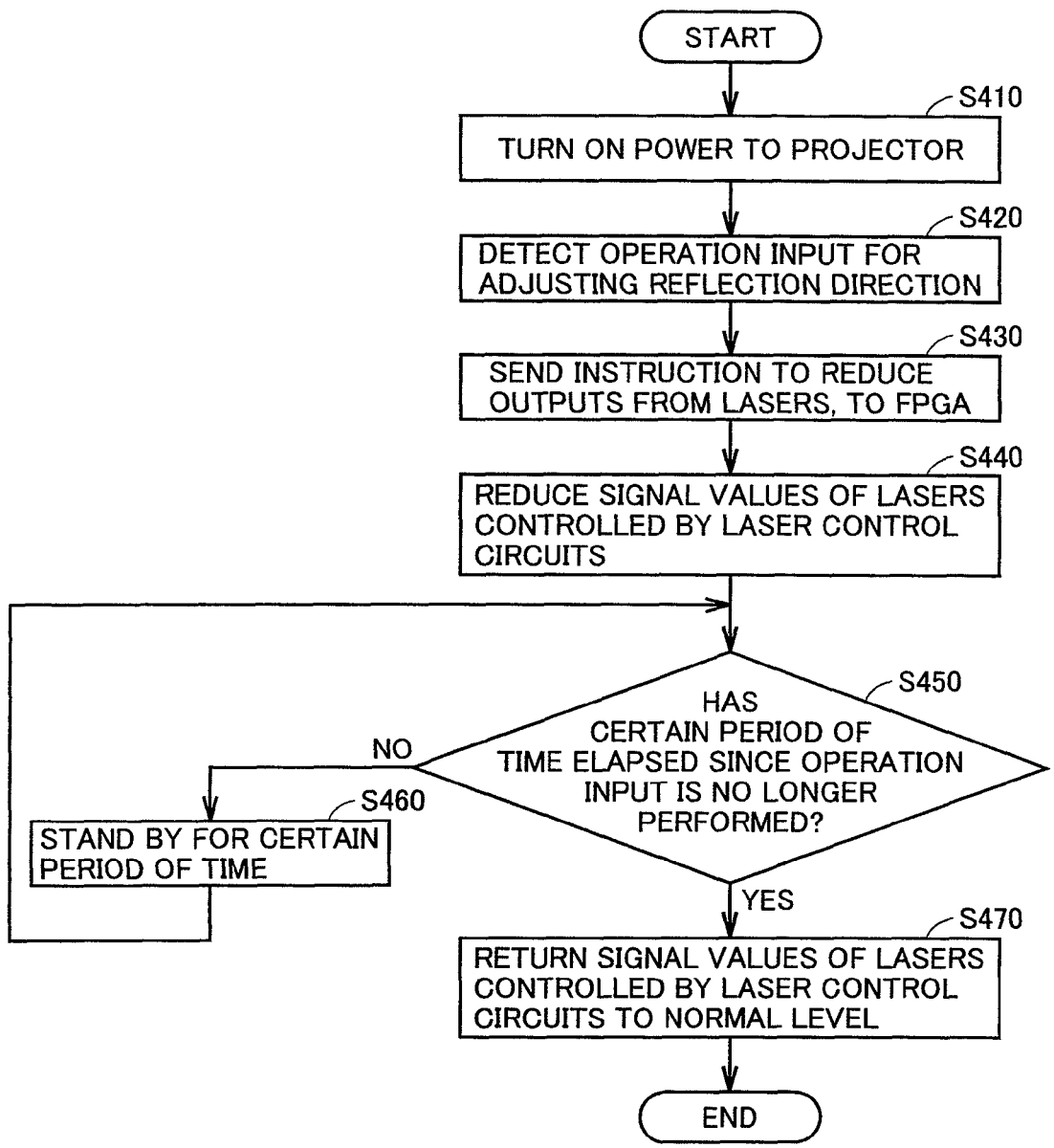
FIG. 8 is a flowchart showing a part of an operation performed by a CPU 341 included in projector 100.

Next, with reference to FIG. 8, a control structure of projector 100 according to the present embodiment will be described. FIG. 8 is a flowchart showing a part of an operation performed by CPU 341 included in projector 100.

In step S410, CPU 341 detects that power to projector 100 is turned on. In step S420, CPU 341 detects, based on a signal sent from operation panel 330, that there has been an input for adjusting the reflection direction of two-axis galvanometer mirror 372.

In step S430, CPU 341 sends an instruction to reduce outputs from the lasers, to timing controller 311 of FPGA 310. In step S440, CPU 341 sends an instruction to timing controller 311 to set signal values of the lasers respectively controlled by laser control circuits 351, 352, and 353, to small values.

In step S450, CPU 341 determines whether a certain period of time has elapsed since an operation input is no longer performed on operation panel 330. If CPU 341 determines that a certain period of time has elapsed since an operation input is no longer performed (YES in step S450), then CPU 341 switches control to step S470. If not (NO in step S450), then CPU 341 switches control to step S460.

In step S460, CPU 341 stands by the process for a certain period of time. For example, CPU 341 suspends the process for a period of time that is pre-specified for standby.

In step S470, CPU 341 returns the signal values of green LD 361 and red/blue LD 362, which are controlled by laser control circuits 351, 352, and 353, to a normal level. More specifically, CPU 341 sends out an instruction to return the signal values to the normal level, to timing controller 311. Timing controller 311 transmits the instruction to data/gradation converter 314 through bit data converter 313. When data/gradation converter 314 provides signals obtained based on the instruction respectively to laser control circuits 351, 352, and 353, the signal values are returned to the normal level. Thereafter, the laser light emitted from green LD 361 and the laser light emitted from red/blue LD 362 have normal output levels.

[Change in the Amount of Light]

Figure 9:
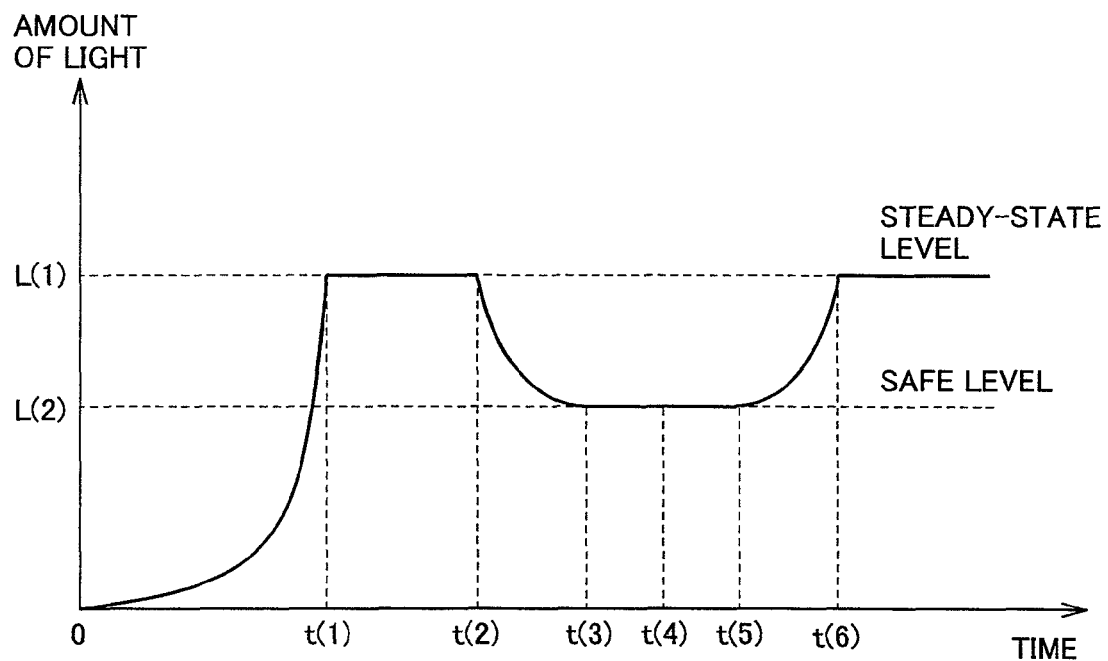

With reference to FIG. 9, a change in the amount of light when projector 100 according to the present embodiment is used will be described. FIG. 9 is a timing chart showing a change in the amount of light after power to projector 100 is turned on.

At time 0, the switch of projector 100 is set to ON. When CPU 341 detects the ON, CPU 341 starts a normal light emission operation. More specifically, CPU 341 provides a light emission instruction to timing controller 311 such that the amount of light obtains a preset steady-state level L (1). Based on the light emission instruction, timing controller 311 provides a signal for driving laser control circuits 351, 352, and 353, through bit data converter 313 and data/gradation converter 314. When green LD 361 and red/blue LD 362 emit the laser light of the respective colors based on control of laser control circuits 351, 352, and 353, the amount of light measured gradually increases. The amount of light reaches the steady-state level L (1) at time t (1). The steady state continues from time t (1) to t (2).

At time t (2), a user of projector 100 operates operation panel 330 to attempt to adjust the reflection direction of two-axis galvanometer mirror 372. Based on a signal from operation panel 330, CPU 341 detects the operation (step S420). In response to the detection, CPU 341 sends an instruction to reduce outputs from the lasers, to front-end FPGA 310 (step S430).

Laser control circuits 351, 352, and 353 change the instruction provided to green LD 361 and red/blue LD 362 and reduce the power of laser light to be outputted. As a result, the amount of light detected gradually decreases from time t (2) and at time t (3) the amount of light is reduced to an amount of light L (2) that is a safe level. The state of the amount of light L (2) continues for a while. The state of the amount of light L (2) continues, for example, at least from time t (3) to time t (4).

Thereafter, when a preset safe time has elapsed from time t (4) and then time t (5) is reached, CPU 341 provides an instruction to bring the laser outputs to a steady-state level, to front-end FPGA 310. Laser control circuits 351, 352, and 353 increase outputs to green LD 361 and red/blue LD 362 and thereby raise laser light outputs. As a result, the amount of light detected gradually increases. At time t (6), the amount of light reaches the amount of light L (1) that is the steady-state level. Thereafter, projector 100 can project video at a normal amount of light.

In the above-described manner, according to projector 100 according to the second embodiment of the present invention, an operation for adjusting the radiation direction of the laser light is detected. When the operation is, for example, an operation for adjusting the tilt of two-axis galvanometer mirror 372, the operation may also include other operations for adjusting an internal mechanism. When projector 100 detects the operation, projector 100 reduces the output level of the laser light to a safe level. By doing so, even when a user performs an operation while projector 100 outputs the laser light, safety of the user can be maintained.

<Variant>

A variant of the present embodiment will be described below. A projector 600 according to the present variant is different from projector 100 according to the foregoing embodiment in that projector 600 has a function of adjusting the amount of the light while adjusting the parallelism of the laser light of respective colors.

[Hardware Configuration]

Figure 10:
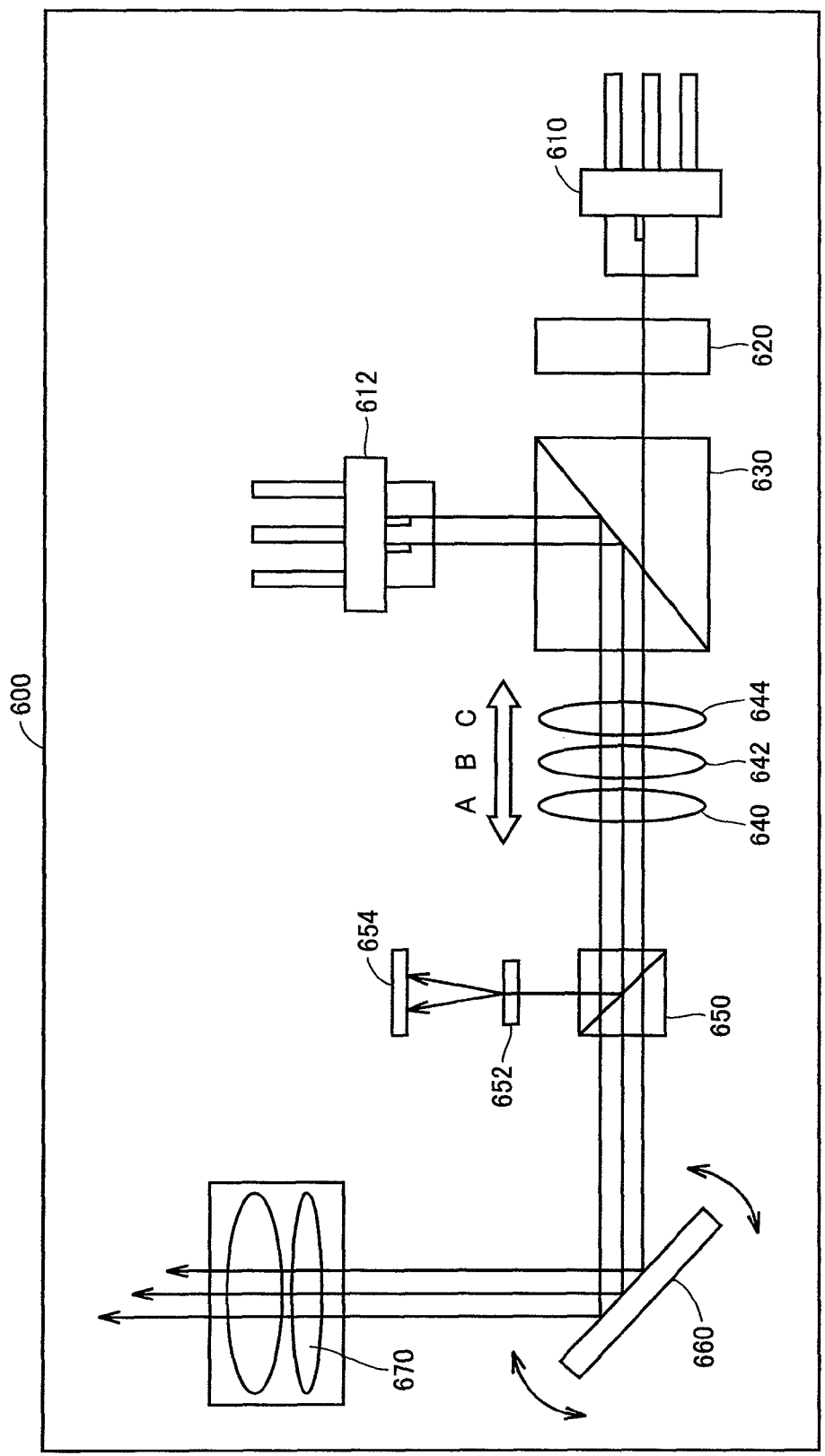
FIG. 10 is a block diagram showing a hardware configuration of a projector 600.

With reference to FIG. 10, a specific configuration of projector 600 according to the present variant will be described. FIG. 10 is a block diagram showing a hardware configuration of projector 600. Projector 600 includes an infrared laser 610, a two-wavelength laser 612, a second-harmonic generator 620, a polarization beam splitter 630, collimate lenses 640, 642, 644 a beam splitter 650, a hologram element 652, a photodetector 654, a two-axis galvanometer mirror 660, and a projection lens 670.

The laser light outputted from infrared laser 610 enters polarization beam splitter 630 through second-harmonic generator 620. On the other hand, when red and blue laser lights outputted from two-wavelength laser 612 enter polarization beam splitter 630, the red and blue laser light is reflected by polarization beam splitter 630 so as to be parallel to the laser light emitted from infrared laser 610. Each laser light enters collimate lenses 640, 642, 644.

The laser light transmitted through collimate lenses 640, 642, 644 enter beam splitter 650. Beam splitter 650 reflects the laser light outputted from two-wavelength laser 612 toward hologram element 652.

The laser light transmitted through hologram element 652 project spots for detecting parallelism in photodetector 654. Photodetector 654 adjusts the parallelism of the laser light. The adjustment is performed, for example, such that the sizes of the spots (the diameters of circles to be projected, etc.) match each other.

On the other hand, the laser light transmitted through beam splitter 650 is reflected by two-axis galvanometer mirror 660. The reflected light enter projection lens 670.

In such a configuration, the output level of each laser light can be suppressed based on a detection result obtained by photodetector 654. Specifically, a controller (not shown) included in projector 600 detects, based on a signal from photodetector 654, that an operation for adjusting the parallelism of the laser light is performed. The signal is outputted in response to an operation performed on a switch of projector 600. Based on the detection, the controller provides an instruction to reduce the laser light output to a safe level L (2) such as that described in the second embodiment, to infrared laser 610 and two-wavelength laser 612.

As a result, when an adjustment for the parallelism of the laser light is made by a user of projector 600, projector 600 can suppress output of the laser light projected from projection lens 670 and accordingly safety can be enhanced.

Third Embodiment

Next, a third embodiment of the present invention will be described. An image display apparatus according to the present embodiment is different from the image display apparatus according to the foregoing second embodiment in that the apparatus can suppress output when a person is detected between the apparatus and a projected image.

[External Appearance]

Figure 11:
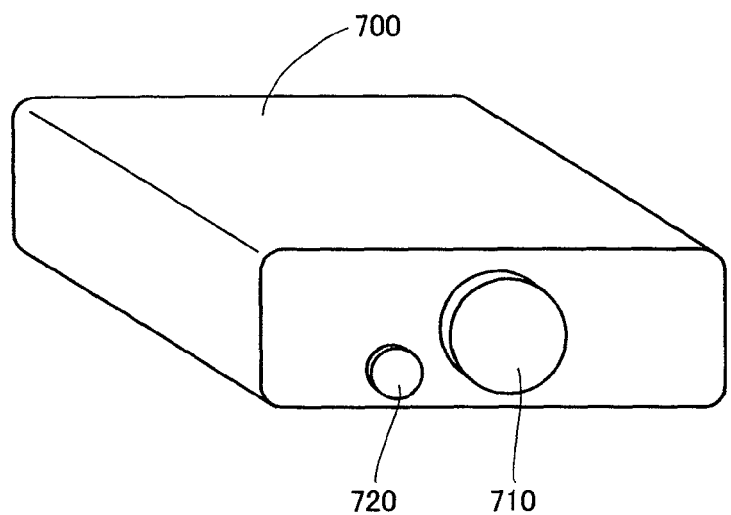
FIG. 11 is a diagram showing an external appearance of a projector 700.

With reference to FIG. 11, a configuration of a projector 700 according to the third embodiment of the present invention will be described. FIG. 11 is a diagram showing an external appearance of projector 700. Projector 700 includes a laser exit aperture 710 and a photodetector 720. It is preferable that photodetector 720 be disposed on the same surface as the disposition surface of laser exit aperture 710. On the other hand, it is preferable that photodetector 720 be disposed at a location where the laser light radiated from laser exit aperture 710 is not directly detected.

[Use Mode]

Figure 12:
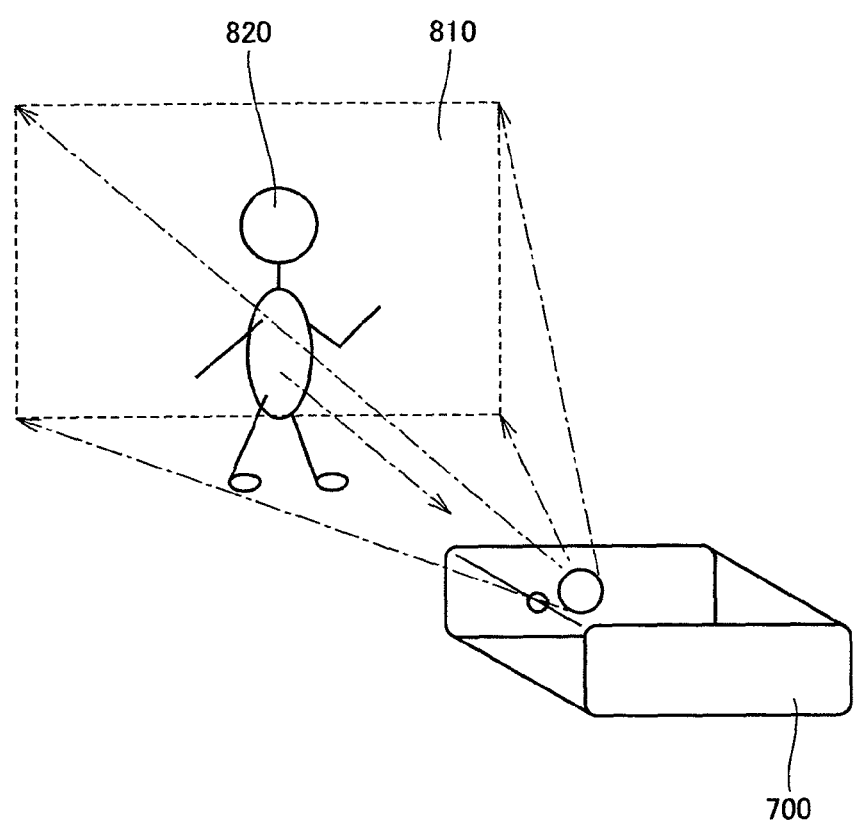
FIG. 12 is a diagram showing a scene where a user is present between projector 700 and an image projected onto a wall.

With reference to FIG. 12, a use mode of projector 700 according to the present embodiment will be described. FIG. 12 is a diagram showing a scene where a user is present between projector 700 and an image projected onto a wall. Projector 700 is projecting an image 810 onto a screen. Normally, it is not desirable that a person be present between projector 700 and image 810 but here it is assumed that a person 820 is present in such an area. In this case, projector 700 detects, by photodetector 720, a change in the amount of light on a projection surface and suppresses laser light output according to the change.

[Hardware Configuration]

Figure 13:
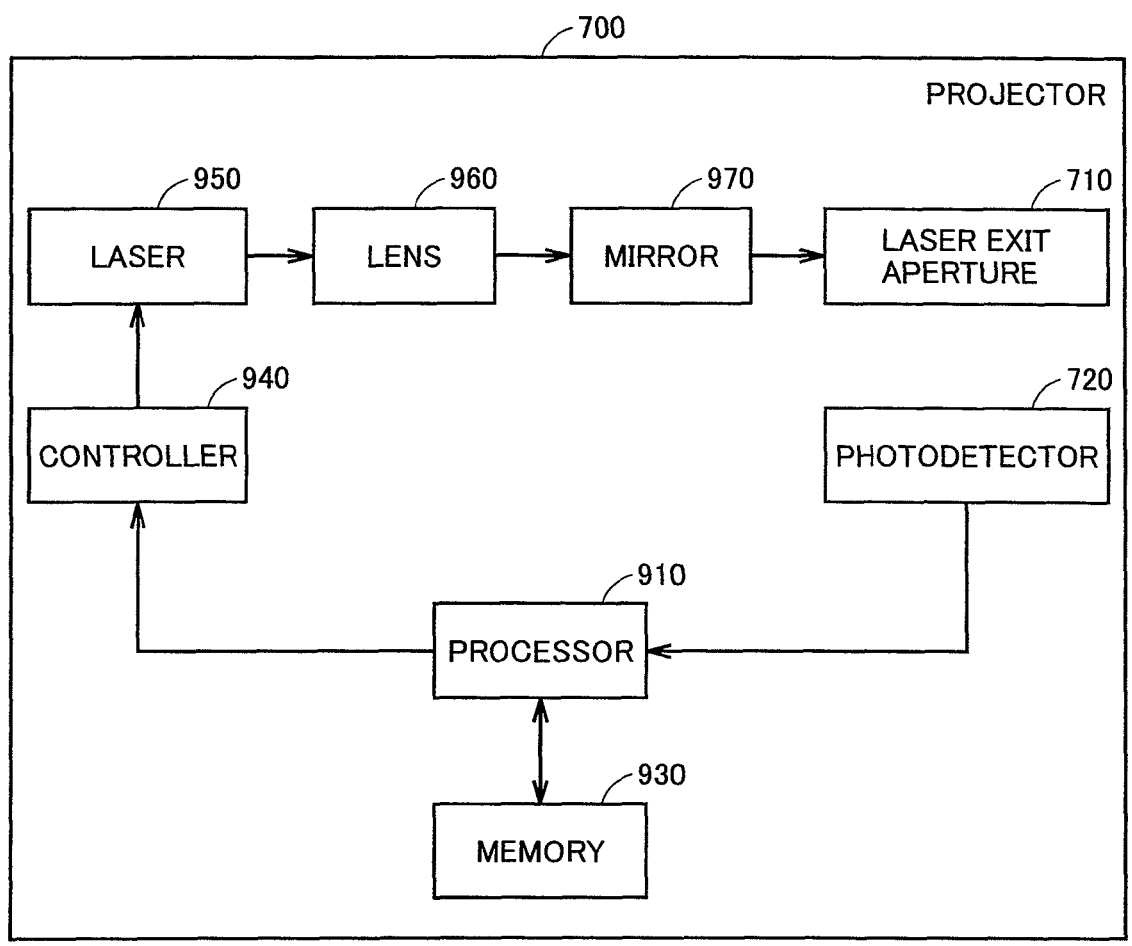
FIG. 13 is a block diagram showing the main hardware configuration of projector 600.

With reference to FIG. 13, a specific configuration of projector 600 according to the second embodiment of the present invention will be described. FIG. 13 is a block diagram showing the main hardware configuration of projector 600.

Projector 600 includes a processor 910, a memory 930, a controller 940, a laser 950, a lens 960, and a mirror 970, in addition to laser exit aperture 710 and photodetector 720. Photodetector 720 detects an amount of light on a projection surface of projector 700. A result of the detection is sent to processor 910.

Processor 910 controls an operation of projector 700 based on a signal provided from an external source or when a preset condition is established. In one aspect, processor 910 controls light emission by laser 950, based on a detection result of an amount of light sent from photodetector 720.

More specifically, processor 910 determines whether an output level change by laser 950 is required, based on a comparison of data that is stored in advance in memory 930 with data representing an amount of light sent from photodetector 720. For example, when a detected amount of light is smaller than a first amount of light that is stored in advance in memory 930 as a setting value, there is a possibility that a person may be present in front of the screen. In this case, processor 910 determines that there is a person on optical paths of the laser light and thus provides an instruction to reduce output from laser 950, to controller 940.

Alternatively, there may be a case in which a detected amount of light is larger than a second amount of light that is stored in advance in memory 930 as a setting value. In this case, it can be considered that there is a person near the laser exit aperture. In this case, too, processor 910 provides an instruction to reduce output from laser 950, to controller 940.

Controller 940 controls drive of laser 950 based on an instruction sent from processor 910. The levels of drive controlled by controller 940 include, for example, a normal level and a level lower than normal.

Laser 950 outputs the laser light according to a control signal from controller 940. In one aspect, laser 950 includes an infrared laser and two-wavelength lasers of red and blue.

Lens 960 focuses laser light outputted from laser 950 in a certain direction and output the laser light. The laser light transmitted through lens 960 are reflected by mirror 970 and projected outside projector 700 through laser exit aperture 710.

[Control Structure]

Figure 14:
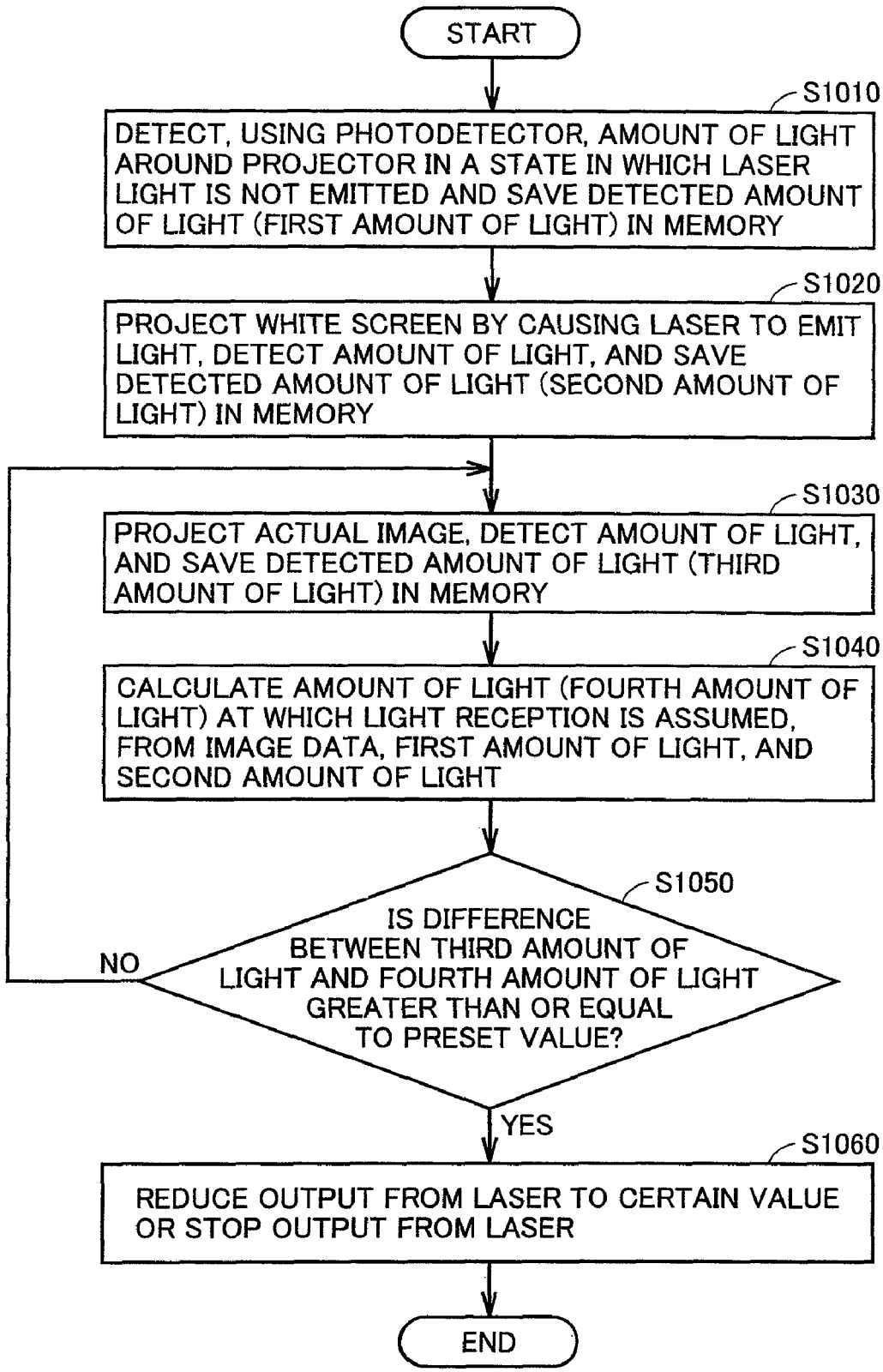
FIG. 14 is a flowchart showing a summary of a process performed by a processor 910.

Next, with reference to FIG. 14, a control structure of projector 700 will be described. FIG. 14 is a flowchart showing a schematic process performed by processor 910.

In step S1010, processor 910 of projector 700 detects, using photodetector 720, an amount of light around projector 700 in a state in which the laser light is not emitted from laser 950, and saves the detected amount of light (first amount of light) in memory 930.

In step S1020, processor 910 causes laser 950 to emit the laser light to project a white screen, detects an amount of light using photodetector 720, and saves the detected amount of light (hereinafter, the second amount of light) in memory 930.

In step S1030, processor 910 projects an actual image, detects an amount of light obtained at that time using photodetector 720, and saves the detected amount of light (hereinafter, the third amount of light) in memory 930.

In step S1040, processor 910 calculates an amount of light (hereinafter, the fourth amount of light) at which light reception is assumed, from image data for displaying the image, the first amount of light, and the second amount of light.

In step S1050, processor 910 determines whether the difference between the third amount of light and the fourth amount of light is greater than or equal to a preset value. If processor 910 determines that the difference between the third amount of light and the fourth amount of light is greater than or equal to a preset value (YES in step S1050), then processor 910 switches control to step S1060. If not (NO in step S1050), then processor 910 returns control to step S1030.

In step S1060, processor 910 sends out an instruction to reduce the laser light output from laser 950 to a preset certain value, to controller 940. Alternatively, processor 910 instructs controller 940 to stop the output from laser 950. Thereafter, laser 950 emits the light in a mode in which the output is reduced to the certain value, or stops the laser light output itself.

In the above-described manner, projector 700 according to the third embodiment of the present invention detects the presence of a person on optical paths of the laser light according to the detected amount of light. When the presence of a person is detected, the laser light is suppressed to minimum outputs (e.g., several lumens). Accordingly, the eyes of a person present near projector 700 can be protected.

Fourth Embodiment

Next, a fourth embodiment of the present invention will be described. An image display apparatus according to the present embodiment is different from the image display apparatuses according to the foregoing embodiments in that the apparatus has a function of suppressing output of the laser light when detecting movement thereof. The movement includes, for example, a change in the location of the image display apparatus, an operation for adjusting the projection direction, or the like.

[Hardware Configuration]

Figure 15:
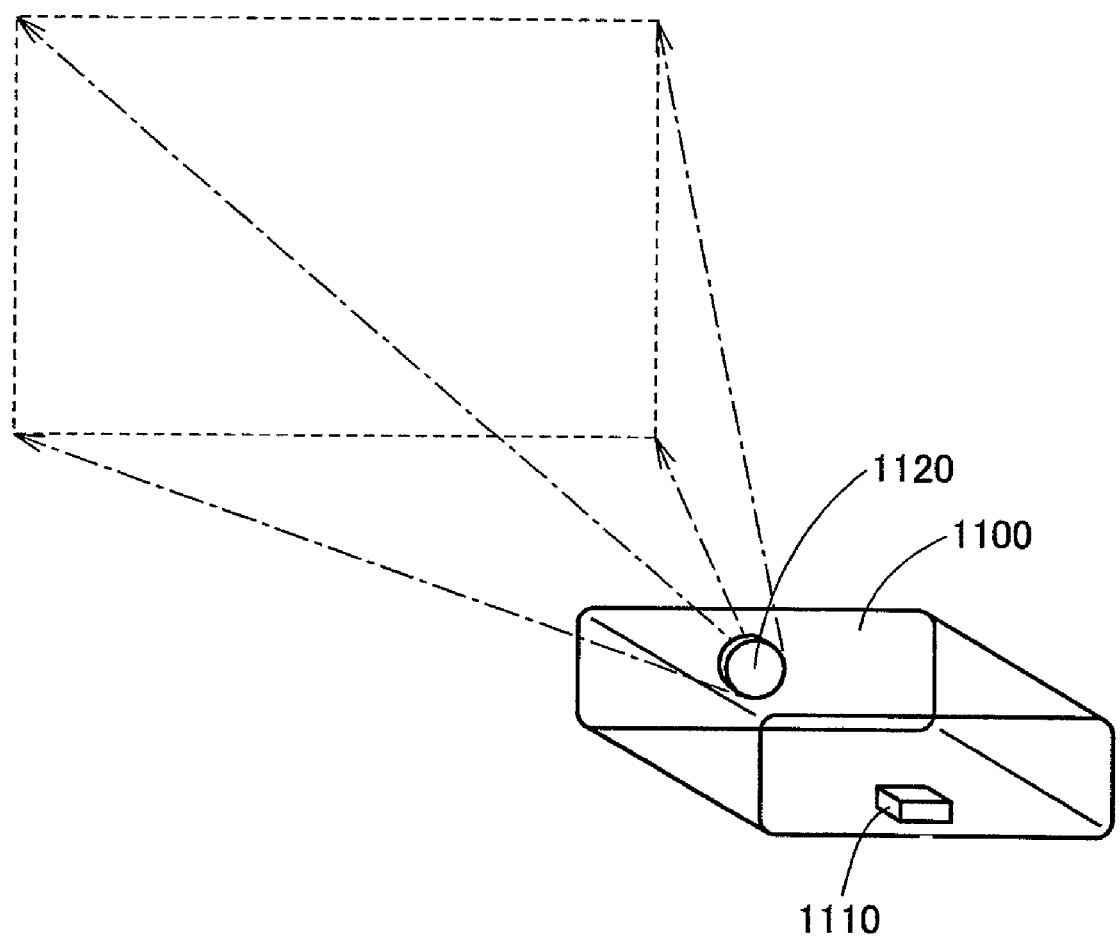
FIG. 15 is a diagram (part 1) schematically showing a configuration of a projector 1100.
Figure 16:
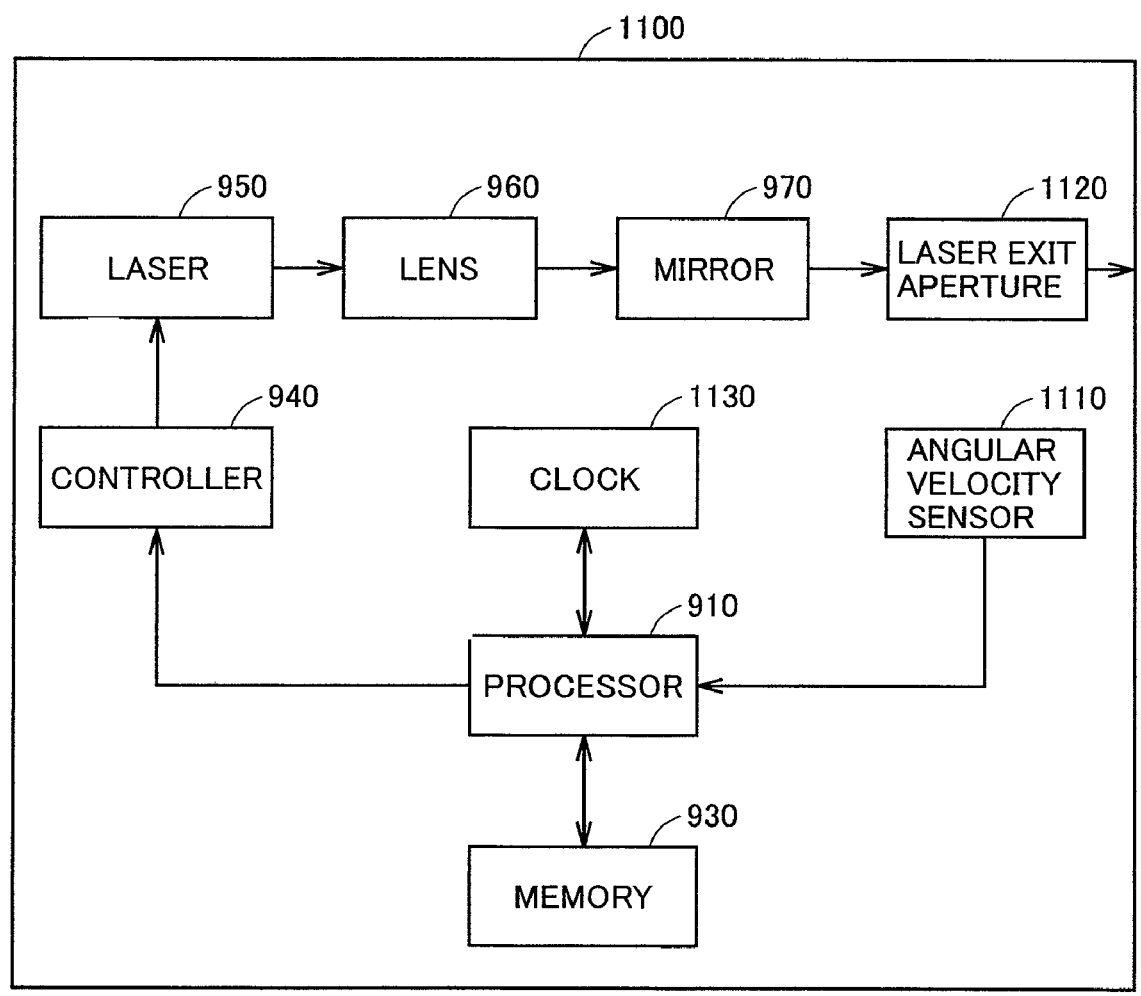
FIG. 16 is a diagram (part 2) schematically showing a configuration of projector 1100.

With reference to FIGS. 15 and 16, a configuration of a projector 1100 which is one mode of the image display apparatus according to the fourth embodiment of the present invention will be described. FIG. 15 is a diagram schematically showing projector 1100. Projector 1100 includes an angular velocity sensor 1110 and a laser exit aperture 1120.

With reference to FIG. 16, projector 1100 includes a processor 910, a memory 930, a clock 1130, a controller 940, a laser 950, a lens 960, and a mirror 970, in addition to angular velocity sensor 1110 and laser exit aperture 1120.

Angular velocity sensor 1110 detects movement of projector 1100 and sends out a result of the detection to processor 910. Processor 910 controls the operation of projector 1100 according to an output from angular velocity sensor 1110. Clock 1130 measures time in projector 1100. Processor 910 switches the mode of the laser light output from laser 950, based on time information sent from clock 1130 and an output from angular velocity sensor 1110.

[Control Structure]

Figure 17:
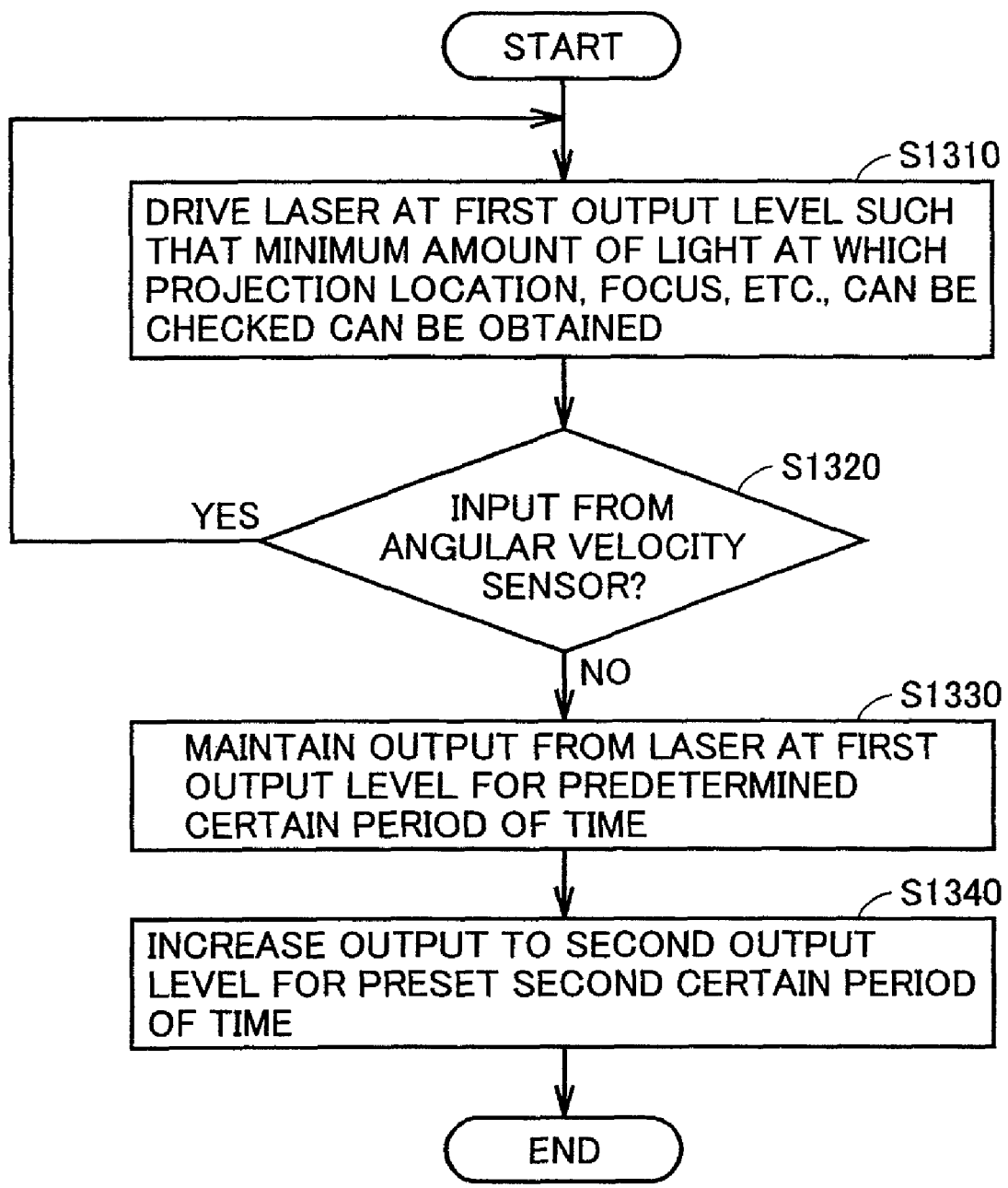
FIG. 17 is a flowchart showing a part of the main operation performed by processor 910 of projector 1100.

Next, with reference to FIG. 17, a control structure of projector 1100 according to the fourth embodiment of the present invention will be described. FIG. 17 is a flowchart showing a part of the main operation performed by processor 910.

In step S1110, processor 910 causes laser 950 to output the laser light at a pre-specified first output level. The first level is specified, for example, to provide a minimum amount of light at which a projection location, focus, etc., can be checked.

In step S1320, processor 910 determines whether there has been an input from angular velocity sensor 1110. If processor 910 determines that there has been an input from angular velocity sensor 1110 (YES in step S1320), then processor 910 returns control to step S1310. Accordingly, laser 950 continues the laser light output at the first output level. On the other hand, if processor 910 determines that there has been no input from angular velocity sensor 1110 (NO in step S1320), then processor 910 switches control to step S1330.

In step S1330, processor 910 causes the output from laser 950 to be maintained at the first output level for a predetermined certain period of time, using time information sent from clock 1130.

In step S1340, processor 910 increases the output from laser 950 to a second output level for a preset second certain period of time, based on time data sent from clock 1130.

<Variant>

Figure 18:
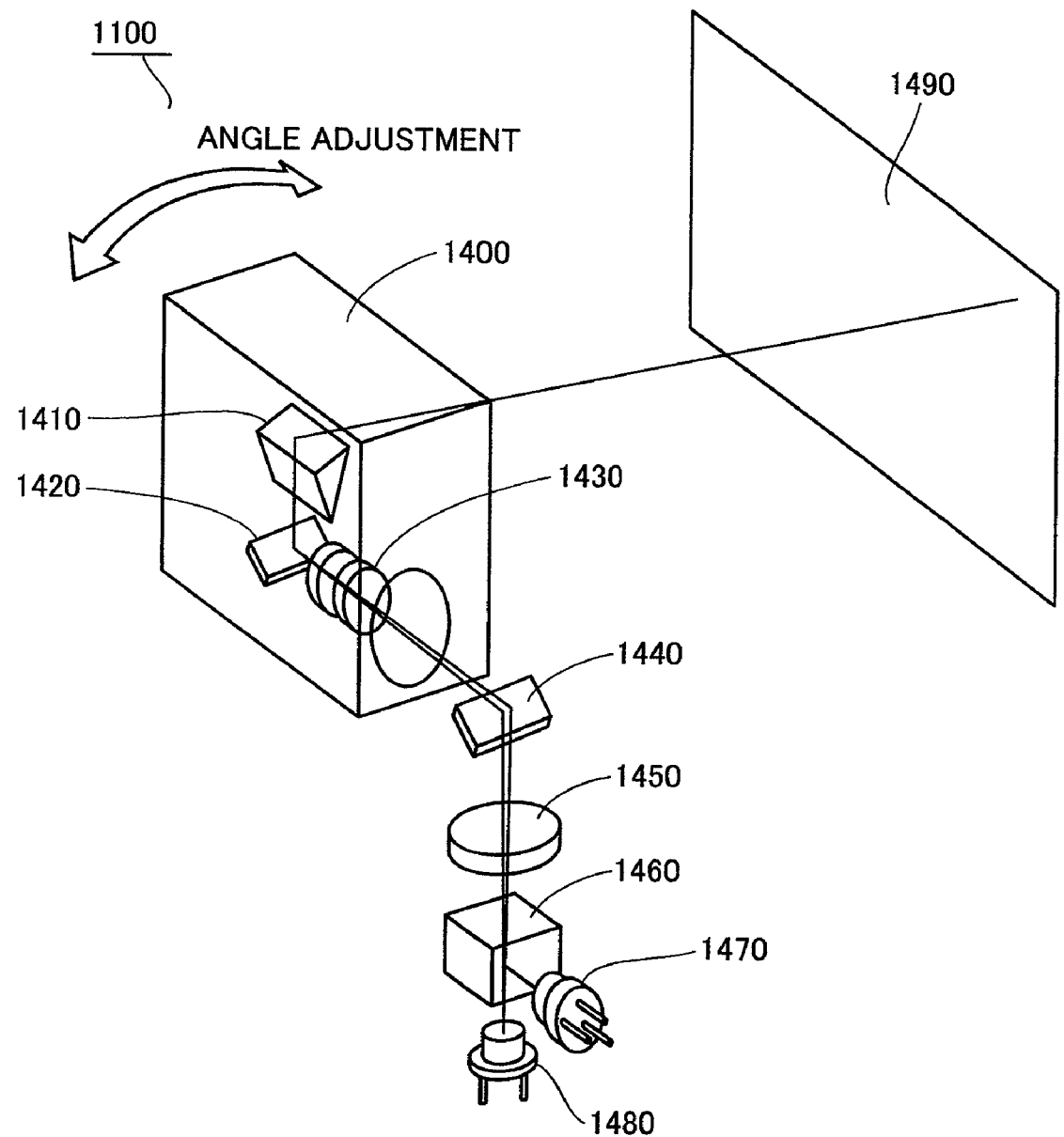
FIG. 18 is a diagram showing a part of a hardware configuration of projector 1100.

With reference to FIG. 18, a detailed configuration of projector 1100 will be described. FIG. 18 is a diagram showing a part of a hardware configuration of projector 1100.

Projector 1100 includes an oscillating unit 1400, a prism 1410, a two-axis galvanometer mirror 1420, an expander lens 1430, a mirror 1440, a collimate lens 1450, a beam splitter 1460, a red/blue laser 1470, and a green laser 1480. The laser light outputted from red/blue laser 1470 and green laser 1480 pass through beam splitter 1460 and collimate lens 1440 and then is reflected by mirror 1440. The reflected light pass through expander lens 1430 and then is reflected by two-axis galvanometer mirror 1420. The reflected light passes through prism 1410 and is polarized and outputted.

In such a configuration, oscillating unit 1400 can be operated by a user of projector 1100 to adjust the projection direction of the laser light. Hence, by providing an angle sensor 1110 inside oscillating unit 1400, processor 910 can detect an operation performed by the user.

Effects of the Embodiments

In the above-described manner, projector 10 according to the first embodiment of the present invention has a built-in screen. Therefore, even in a place where there is no screen, by folding projector 10, an image can be projected. Accordingly, the user can check image content before projecting an image.

Also, when the projectors according to the second to fourth embodiments detect an operation by a user, the projectors suppress outputs of the laser light. This prevents laser light from radiating the eyes of the user. Particularly, in the case of a foldable projector, it is frequent that the user performs an operation near the projector and thus the user can be prevented from being accidentally exposed to the laser light.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An image display apparatus comprising:
   a first casing;
   a second casing;
   a third casing, said first casing and said second casing being configured to be foldable relative to each other, and said second casing and said third casing being configured to be foldable relative to each other;
   a light source that emits laser light;
   a projecting unit disposed in said first casing and configured to project laser light outside said image display apparatus;
   a screen disposed in said third casing and receiving an image to be projected; and
   a reflecting unit disposed in said third casing and configured to reflect the laser light from said light source toward said screen,
   wherein the screen receives an image to be projected when the image display apparatus is in a folded position in which the first casing and the second casing are folded relative to each other, and the second casing and the third casing are folded relative to each other.

2. The image display apparatus according to claim 1, wherein a surface to which said reflecting unit is attached faces said screen.

3. The image display apparatus according to claim 2, wherein when said first casing and said third casing are folded, an optical axis of said projecting unit reaches a surface of said reflecting unit.

4. The image display apparatus according to claim 1, further comprising: a detecting unit configured to detect movement of said first casing; and a control unit configured to control light emission by said light source, in response to said movement detection.

5. An image display apparatus comprising:
a first casing;
a second casing;
a third casing, said first casing and said second casing being configured to be foldable relative to each other, and said second casing and said third casing being configured to be foldable relative to each other;
a light source that emits laser light;
a projecting unit disposed in said first casing and configured to project laser light outside said image display apparatus;
a screen disposed in said third casing and receiving an image to be projected;
a reflecting unit disposed in said third casing and configured to reflect the laser light from said light source toward said screen; and
a detecting unit configured to detect movement of said first casing; and a control unit configured to control light emission by said light source, in response to said movement detection,
wherein said control unit is configured to suppress an output from said light source to a preset output or less.

6. The image display apparatus according to claim 5, wherein said control unit is configured to stop an operation of said light source.

* * * * *